Oct. 9, 1923.                           1,470,018
B. LOVE ET AL
CHECK VALVE
Filed July 11, 1922

Witnesses:
H. L. Fox,
H. Berman.

Inventors
B. Love,
C. Gaylor,
By Clarence A. O'Brien
Attorney

Patented Oct. 9, 1923.

1,470,018

UNITED STATES PATENT OFFICE.

BENSON LOVE AND CLINE GAYLOR, OF WOOLRICH, PENNSYLVANIA.

CHECK VALVE.

Application filed July 11, 1922. Serial No. 574,340.

*To all whom it may concern:*

Be it known that we, BENSON LOVE and CLINE GAYLOR, citizens of the United States, residing at Woolrich, in the county of Clinton and State of Pennsylvania, have invented new and useful Improvements in Check Valves, of which the following is a specification.

In carrying out the present invention it is our purpose to provide a check valve which will be constructed in such manner that the valve and stem may be readily and conveniently removed from the body or casing of the valve for the purpose of repairing or replacing the valve disk and stem.

It is also our purpose to provide a check valve wherein the valve disk and stem may be readily and conveniently inspected whenever desired and removed when necessary, and wherein the component parts will be so arranged and correlated as to reduce the possibility of derangement to a minimum.

Furthermore, we aim to provide a check valve which will embrace the desired features of simplicity, efficiency and durability, which will be reliable in operation under all conditions and which may be manufactured and marketed at small cost.

With the above recited objects in view, and others of a similar nature, the invention resides in the construction, combination and arrangement of parts set forth in and falling within the scope of the appended claims.

Figure 1:
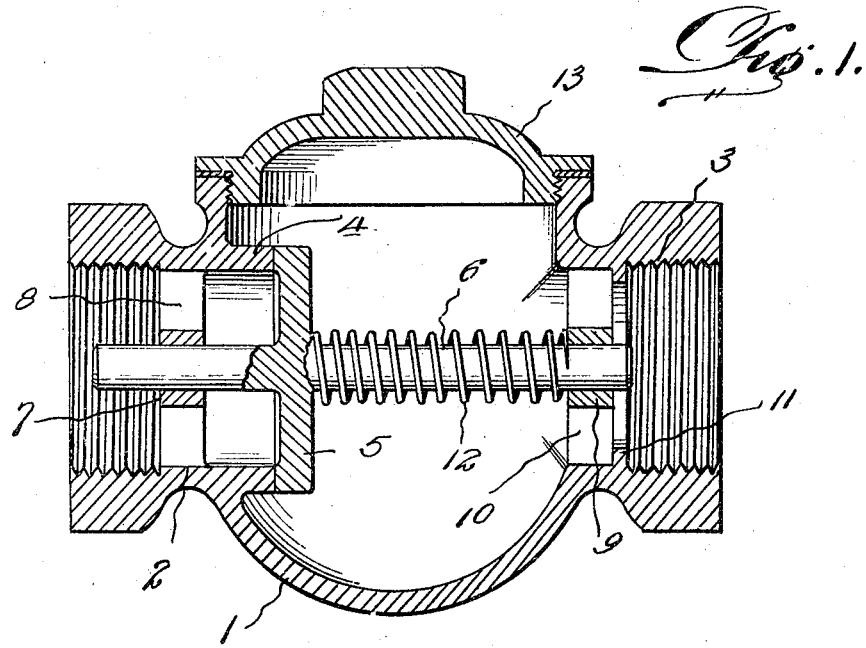
Figure 1 is a longitudinal sectional view of a check valve constructed in accordance with our invention.
Figures 2, 3:
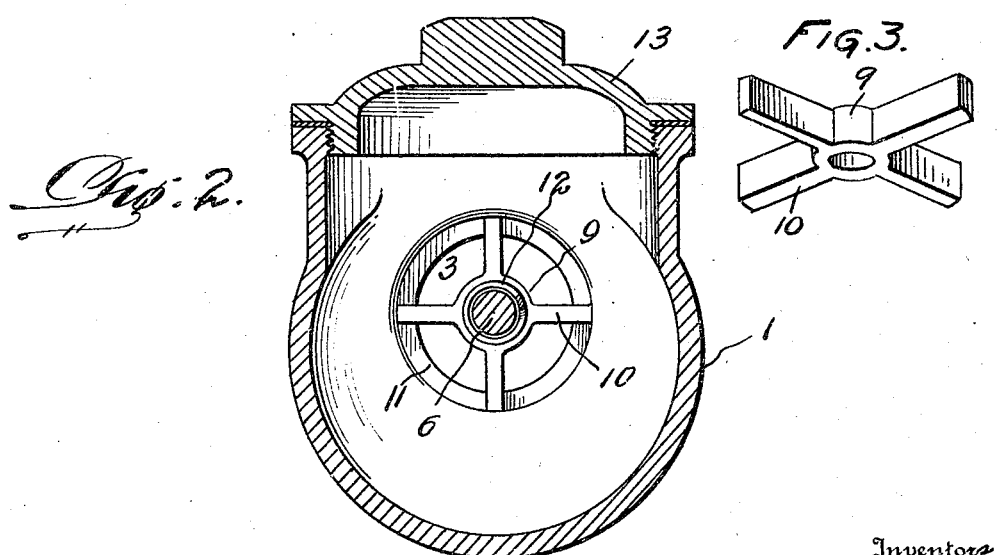
Figure 2 is a vertically cross sectional view thereof.
Figure 3 is a perspective view of the valve guide.

Referring now to the drawings in detail, 1 designates a casing or body of the usual shape provided at one end with an inlet 2 and at its opposite end with an outlet 3. The inlet and outlet are provided with internal threads so that the intake and outlet pipes may be connected to the casing or body, as is readily understood.

Formed on the inner wall of the casing 1 concentrically of the intake 2 is a circular flange 4 having its inner edge ground to provide a valve seat and engaging against the seat on the flange 4 is a valve disk 5 mounted upon a stem 6 that extends longiudinally of the casing axially of the inlet and outlet openings. One end of the stem 6 extends into the inlet 2 and is slidably mounted within a guide ring 7 carried by a spider 8 that is integral with the inner wall of the inlet. The other end of the stem 6 extends into the outlet 3 and is slidably mounted within a bearing ring 9 carried by a spider 10 that fits against a flange 11 formed in the wall of the outlet opening, the spider 10 being removable from the outlet opening. Encircling the stem 6 between the bearing collar 9 and the valve disk 5 is a coiled expansion spring 12 that acts to hold the valve disk normally against its seat and also acts to hold the collar 9 and spider 10 in proper position against the flange 11.

The top of the casing or body 1 is formed with a circular opening which is threaded internally and threaded into this opening is a cap or cover 13 which may be removed when it is desired to have access to the body or casing 1 for the purpose of inspection, repair or replacing of the parts.

In practice, the valve disk 5 normally engages the valve seat on the flange 4 and is held against the seat by the spring 12 so as to check the return of the fluid after it passes through the casing. If, however, it is desired to remove the valve for repair or replacement the cap 13 is taken off of the casing and the valve disk 5 pushed back against the action of the spring 6, so as to relieve one end of the stem of the bearing 7. When the stem is pulled out of the bearing 7 it may be then pulled upwardly through the top of the casing, and as the stem moves upwardly the spider 10 carrying the bearing ring 9 tilts and pulls away from the flange 11, thereby permitting the valve disk, the stem, the spring and the bearing 9 and spider 10 to be removed from the casing.

We have entered into a detail description of the construction and relative arrangement of parts embraced in the present embodiment of our invention with a view to imparting a full, clear and exact understanding of the said embodiment. We do not desire, however, to be understood as confining ourselves to the said specific construction and relative arrangement of parts, inasmuch as in the future practice of our invention such changes or modifications may be made as fairly fall within the scope of our invention as defined by our appended claims.

Having thus described the invention, what is claimed as new, is:—

1. A check valve comprising a casing formed with inlet and outlet openings, a flange formed on the inner wall of the casing concentrically of the inlet and having its inner edge ground to provide a valve seat, a valve disk normally engaging said seat, a stem integral with said valve disk and arranged longitudinally of the casing and having one end extending into said inlet and the other end extending into said outlet, a bearing ring in said inlet for the corresponding end of said stem, a bearing ring in said outlet for the remaining end of said stem, a spring holding said disk normally in engagement with said seat, a spider within said outlet supporting said last named bearing and removable from the casing and a flange integral with the wall of said outlet against which said spider abuts.

2. A check valve comprising a casing formed with inlet and outlet openings, a flange formed on the inner wall of the casing concentrically of the inlet and having its inner edge ground to provide a valve seat, a valve disk normally engaging said seat, a stem integral with said valve disk and arranged longitudinally of the casing and having one end extending into said inlet and the other end extending into said outlet, a bearing ring in said inlet for the corresponding end of said stem, a bearing ring in said outlet for the remaining end of said stem, a spring holding said disk normally in engagement with said seat, a spider within said outlet supporting said last named bearing and removable from the casing, a flange integral with the wall of said outlet against which said spider abuts, and a removable cover plate for said casing whereby access may be had to the casing to remove said valve disks, stem and removable spider.

In testimony whereof we affix our signatures.

BENSON LOVE.
CLINE GAYLOR.